United States Patent Office 2,888,407
Patented May 26, 1959

2,888,407

MANUFACTURE OF CELLULAR MATERIAL FROM BITUMEN AND STYRENE

Alfred Cooper and Leonard Baxter MacQueen, Croydon, England, assignors to Expanded Rubber Company Limited, Croydon, England, a British company No Drawing. Application June 2, 1952
Serial No. 291,312

Claims priority, application Great Britain
June 13, 1951

2 Claims. (Cl. 260—2.5)

This invention relates to cellular materials for thermal insulation, buoyancy, sandwich constructions, and for cushioning purposes, and for a variety of purposes where a low density material is essential.

It is well known that cellular materials have been produced by the formation of gas bubbles in the material while in a plastic condition and in two different forms, namely:

(a) Expanded materials so-called in which the cells are not inter-communicating—closed cell structure—and which are therefore non-absorbent;

(b) Sponge materials in which the cells are mainly in communication—open cell structure—and which are therefore highly absorbent. The type of material obtained when forming gas bubbles in the material in its plastic state depends upon whether the material is supported by external pressure during the formation of the gas bubbles until the material is sufficiently rigid to retain the gas in the cells formed, or whether the gas after forming the cells is allowed to burst the cell walls and escape freely from the plastic mass into the surrounding atmosphere.

The present invention is adapted to the production of expanded materials, i.e. closed cell materials.

In the past three decades industry has been made familiar with a large number of expanded materials which find application in the thermal insulation, buoyancy, sandwich construction and cushioning fields. Some of these are expanded rubber, expanded ebonite, expanded glass, expanded plastics of a great variety of types and chemical composition, expanded concrete, expanded ceramics, and so on. It is unfortunately the case, however, that those expanded materials which have the desired physical properties such as low density, low water absorption, low thermal conductivity, high compression and impact resistance, are relatively costly materials. On the other hand, the cheaper materials such as expanded glass and expanded concrete have not the low density, low conductivity or low water absorption, some of the most desirable properties for thermal insulation, buoyancy, and sandwich construction. For these reasons it has always been the research problem to find a cheap expanded material which would at the same time comply with such an exacting specification covering its physical properties.

A bitumen, bituminous substance or like material, mainly on account of its relatively low cost, availability, low water permeability, low water absorption, low thermal conductivity, etc. has always seemed to be a material which would satisfy manufacturers as far as cost considerations are concerned, and for some years now a great deal of experimental work has been carried out with a view to getting a stable expanded bitumen with good physical properties. Some success has been achieved in the past with the expanding of bitumen by means of blowing agents to form a material of relatively light density. However, such a product has considerable cold flow by the very nature of bitumen, and owing to the light density the structure is fragile, and in fact has such a low impact strength that it would be considered quite unsuitable as a commercial product.

There has thus been a long-felt want for a cheap expanded material with low density, low thermal conductivity, high compression strength, improved impact strength, low water absorbency, low vapour transmission, and dimensional stability at elevated temperatures, and with an entire absence of cold flow normally associated with bituminous substances. In spite of the large number of prior proposals for producing expanded resinous materials, this demand does not appear to have been met hitherto, but it has now been found possible to incorporate materials into bituminous substances which enable them to fulfill all the requirements of a cheap cellular material.

According to the present invention, a process for the production of a closed cell expanded material consisting predominantly of bitumen comprises incorporating together a bitumen, a blowing agent, a synthetic resin, and sufficient plasticiser to form a plastic dough, the plasticiser being removable by heating to the temperature at which the blowing agent selected forms a gas under sufficient pressure to prevent the gas from fully expanding the dough, cooling the dough, releasing the pressure, and finally re-heating to a temperature at which the embryo gas bubbles will expand the material and holding the material at that temperature until the plasticizer has been removed.

The term "bitumen" as employed above is intended to include not only the natural bitumens such as Gilsonite, but also similar hard colloidal pitch-like material which softens when heated and which is derived from coal tar and obtained as a residue from petroleum distillates.

The ethenoid plastics have been found to give very satisfactory results but any synthetic resin may be employed which may be obtained in a sufficiently softened condition by plasticising with a solvent under normal temperatures and pressures to convert into a dough, but which either by evaporation or polymerisation of the solvent may be converted from a heat softenable material to one which is hard under the conditions to which the cellular material may be submitted in use. As above indicated, however, up to the present the ethenoid plastics, in particular polyvinyl chloride, have been found most suitable for carrying out the invention.

The plasticising solvent may be a solvent which may be removed by volatilisation such as benzene, methyl acetate, or other easily volatilisable solvent, or it may be one such as a monomer or low polymer which during the expansion and hardening process hereinafter described will be polymerised and thus become hardened, according to the process set forth in our co-pending patent application Serial No. 247,775, filed September 21, 1951, now U.S.P. 2,746,940; in either case the plasticiser is removed as such by heating. For such purposes where an ethenoid plastic is employed, the monomer may perform the dual function of supplying the synthetic resin and the plasticiser because in its monomeric form it will plasticise the bitumen and then by polymerisation disappear as a plasticiser and appear as a resin.

A large variety of blowing agents can be used. For example, inorganic types such as ferrous oxalate, sodium bicarbonate, ammonium carbonate, a mixture of sodium nitrite and ammonium chloride; or organic types can be used such as dinitroso-pentamethylene tetramine, diazoaminobenzene, p,p'-oxy-bis (benzene sulphonyl hydrazide) α-α-azo-bis-(isobutyronitrile), 1,1-azo-bis-(cyclo-hexane carbonitrile), benzo-sulpho-hydrazide, urea and biuret.

The precise blowing agent chosen is dependent on such factors as the density required, the plastic modifying or reinforcing agent used and interchange between the various types can be made with corresponding alteration to processing conditions and the ingredients used.

The following examples will illustrate the nature of the invention, Example 1 being carried out with an unmodified bituminous material for the purpose of comparison, the parts being parts by weight:

Example 1

A mixture of 100 parts of a petroleum distillation bituminous residue sold under the trade name "Iranolin 80" by the Anglo-Iranian Oil Company and 25 parts of azo-di-iso-butyro-dinitrile is ball milled together for one hour. The fine powder thus obtained is transferred to a paste or dough mixer of the Baker Perkins or Werner Pfleiderer type. 10 parts of methyl acetate are added and the mixing is commenced and continued until a smooth dough is obtained. This paste is discharged into a mould having a cavity 6" x 6" x ⅜" in depth until it completely fills the mould. Over this is placed a metal plate to close the mould which is so designed as to be gas-tight, and the mould is placed on a steam heated press maintained at a temperature of 325° F. and the mould closed with a hydraulic load sufficient to maintain a pressure of 1 ton per square inch of the material.

At the end of 8 minutes the press and mould are cooled by circulating cold water through the platens. This may take 15 or 30 minutes depending on the temperature of the water. When cold, the hydraulic pressure is released and the blank is removed from the mould. The blank is then placed in an oven at 220° F. for a period of 2 days, during which time the blank expands to a density of approximately 5 lbs. per cubic foot, and all the residual methyl acetate has by this time dried out. A light fragile product is obtained by this method, having a compression strength of approximately 2-3 lbs. per square inch.

Example 2

The procedure was the same as in Example 1 above except that the 10 parts of methyl acetate solvent was replaced by an equal weight of monomeric styrene, inhibited with 0.10% catechol. The heating cycle was 5 minutes at 320° F. (and expansion and drying was done at 220° F. as before). A product having a density of 5 lbs. per cubic foot was obtained which was much stronger than the sample of 1 above. The compression strength was about 30–35 lbs. per square inch.

Example 3

A mixture of 100 parts of bituminous material in the form of a coal tar pitch sold under the trade name "Carbitum Pitch," by Messrs. Binney Smith and Ashley Limited 15 parts azo-di-iso-butyro-dinitrile, and 25 parts ethyl cellulose, was ball milled as in Example 1 above, transferred to an internal mixer, and intimately mixed with 12 parts of a 50/50 mixture of isopropyl acetate and styrene, the latter being inhibited with 0.1% parabenzoquinone, until a smooth paste was obtained. This was heated in a press and expanded as in 1 above, and gave a product having a density of 10 lbs. per cubic foot, and a compression strength of circa 150 lbs. per square inch.

Example 4

As in 3, except that the ethylcellulose was replaced by an equal weight of polystyrene powder. A product having a density of 12 lbs. per cubic foot and a compression strength of circa 150 lbs. per square inch was obtained.

Example 5

A mixture of 100 parts of Norwegian pitch, 20 parts of diazoamino benzene, 40 parts polyvinylchloride and 10 parts of lead stearate was ball milled, transferred to an internal mixer, and 20 parts of toluene added to give a smooth paste. This was transferred to a mould having a 6" x 6" x 1" cavity and heated as already described for 22 minutes at 320° F. and then cooled, the blank removed, and expansion and drying done in an oven at 220° F. for three days. A product having a density of circa 4 lbs. per cubic foot was obtained, which has a compression strength of about 40 lbs. per square inch.

The invention also includes a cellular material consisting predominantly of bitumen and containing a synthetic resin, the compression strength of which material is substantially in excess of 3 lbs. per square inch, which is the compression strength of a bitumen product without such addition of synthetic resin.

We claim:

1. A process for the production of a closed cell expanded material consisting predominantly of bitumen, which process comprises mixing into a paste the bitumen, a blowing agent and monomeric styrene, heating the mixture to the temperature at which the blowing agent forms a gas under sufficient pressure to prevent the gas from fully expanding the mass, cooling the mass, releasing the pressure, and finally reheating to a temperature at which the embryo gas bubbles will expand the material, and holding the material at that temperature until substantially no volatile substances are present in the mass.

2. A process for the production of a closed cell expanded material consisting predominantly of bitumen, which process comprises mixing into a paste the bitumen, a blowing agent, an ethyl cellulose together with a solvent consisting of isopropyl acetate and monomeric styrene, heating the mixture to the temperature at which the blowing agent forms a gas under sufficient pressure to prevent the gas from fully expanding the mass, cooling the mass, releasing the pressure, and finally reheating to a temperature at which the embryo gas bubbles will expand the material, and holding the material at that temperature until the isopropyl acetate present has been removed and the styrene converted into a hard polymer.

References Cited in the file of this patent

UNITED STATES PATENTS

| | | |
|---|---|---|
| 2,132,969 | Rau | Oct. 11, 1938 |
| 2,314,181 | Winterkorn | Mar. 16, 1943 |
| 2,384,611 | Douthett | Sept. 11, 1945 |
| 2,386,995 | Wigal | Oct. 16, 1945 |

FOREIGN PATENTS

| | | |
|---|---|---|
| 578,513 | Great Britain | July 2, 1946 |
| 632,208 | Great Britain | Nov. 17, 1949 |
| 461,607 | Canada | Dec. 6, 1949 |